US010442406B2

(12) United States Patent
Sato

(10) Patent No.: US 10,442,406 B2
(45) Date of Patent: Oct. 15, 2019

(54) DEVICE FOR HEATING WASHER FLUID

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 147 days.

(21) Appl. No.: 15/527,756

(22) PCT Filed: Nov. 19, 2015

(86) PCT No.: PCT/JP2015/082601
§ 371 (c)(1),
(2) Date: May 18, 2017

(87) PCT Pub. No.: WO2016/088571
PCT Pub. Date: Jun. 9, 2016

(65) Prior Publication Data
US 2017/0334408 A1 Nov. 23, 2017

(30) Foreign Application Priority Data

Dec. 2, 2014 (JP) .................................. 2014-244321

(51) Int. Cl.
B60S 1/48 (2006.01)
B60S 1/50 (2006.01)
(Continued)

(52) U.S. Cl.
CPC ............. B60S 1/488 (2013.01); B60S 1/50 (2013.01); F24H 1/009 (2013.01); F24H 1/202 (2013.01)

(58) Field of Classification Search
CPC .. B60S 1/488; B60S 1/50; F24H 1/009; F24H 1/202
(Continued)

(56) References Cited

U.S. PATENT DOCUMENTS 1,674,369 A * 6/1928 McQuinn ................ F24H 1/202
392/450
1,873,820 A 8/1932 Carpenter
(Continued)

FOREIGN PATENT DOCUMENTS

CN 1268089 A 9/2000
GB 2454689 5/2009
(Continued)

OTHER PUBLICATIONS

Search Report issued in Japan Patent Application No. PCT/JP2015/082601, dated Jan. 12, 2016.
(Continued)

Primary Examiner — William M McCalister
(74) Attorney, Agent, or Firm — Greenblum & Bernstein, P.L.C.

(57) ABSTRACT

A washer fluid heating device includes a container that contains a washer fluid, a lid portion attached to a first end of the container to face an accommodation space for the washer fluid, heating means that has a proximal end portion attached to the lid portion and extends toward the accommodation space, and an outflow pipe having an outlet disposed in the accommodation space to allow the washer fluid in the accommodation space to flow out, and the outlet of the outflow pipe is provided such that a space formed between a horizontal plane passing through the outlet and an inner wall surface at a second end on an opposite side to the first end of the container corresponds to 10% or more of a volume of the accommodation space.

20 Claims, 6 Drawing Sheets

(51) Int. Cl.
*F24H 1/00* (2006.01)
*F24H 1/20* (2006.01)

(58) Field of Classification Search
USPC .................................................. 392/451–457
See application file for complete search history.

(56) References Cited

U.S. PATENT DOCUMENTS

| | | | | |
|---|---|---|---|---|
| 1,950,113 | A * | 3/1934 | Kirkwood | F24H 1/106 338/222 |
| 3,447,560 | A * | 6/1969 | Dodson | F24H 1/202 122/19.1 |
| 3,614,386 | A * | 10/1971 | Hepplewhite | F24H 1/202 392/451 |
| 3,962,560 | A | 6/1976 | Braathen | |
| 4,296,799 | A * | 10/1981 | Steele | B29C 44/1242 126/641 |
| 4,403,137 | A * | 9/1983 | Glazer | F24H 1/202 392/448 |
| 4,409,958 | A * | 10/1983 | Fillios | F24D 19/1051 122/14.1 |
| 4,514,617 | A * | 4/1985 | Amit | F24H 1/20 122/18.4 |
| 4,578,565 | A * | 3/1986 | Dawidowitch | F24H 9/0021 122/19.1 |
| 4,587,401 | A * | 5/1986 | Ekman | F24H 1/20 126/362.1 |
| 4,637,347 | A * | 1/1987 | Troy | F24D 3/082 122/15.1 |
| 4,757,182 | A * | 7/1988 | Albright | A47J 31/56 392/450 |
| 4,911,108 | A * | 3/1990 | Akkala | F23C 5/00 122/18.4 |
| 5,092,279 | A * | 3/1992 | Barmore | F24H 1/202 122/19.1 |
| 5,179,914 | A * | 1/1993 | Moore, Jr. | F24H 1/182 122/18.3 |
| 5,668,922 | A * | 9/1997 | Ross | B29C 65/561 122/19.2 |
| 5,712,951 | A * | 1/1998 | Chou | F24H 1/18 122/14.21 |
| 6,282,372 | B1 * | 8/2001 | Boros | F24H 1/202 392/449 |
| 6,321,036 | B1 * | 11/2001 | Huang | F24H 1/202 392/441 |
| 6,633,726 | B2 * | 10/2003 | Bradenbaugh | F24H 9/2021 219/497 |
| 7,209,651 | B1 * | 4/2007 | Knoeppel | F24H 9/2021 219/482 |
| 7,570,877 | B1 * | 8/2009 | Huang | F24H 1/202 392/452 |
| 7,588,194 | B2 * | 9/2009 | Shank | B05B 9/002 239/130 |
| 7,634,976 | B2 * | 12/2009 | Gordon | F24H 9/124 122/14.3 |
| 8,867,907 | B2 * | 10/2014 | Penton | F24H 1/1818 392/453 |
| 2010/0034528 | A1 * | 2/2010 | Willis | F24D 17/0068 392/451 |
| 2012/0183281 | A1 * | 7/2012 | Sato | B60S 1/488 392/441 |
| 2012/0272927 | A1 * | 11/2012 | Jonsson | F24D 11/002 122/19.1 |

FOREIGN PATENT DOCUMENTS

| | | |
|---|---|---|
| JP | 63-305060 | 12/1988 |
| JP | 2-70557 | 3/1990 |
| JP | 2012-144194 | 8/2012 |
| WO | 2007/10538 | 1/2007 |

OTHER PUBLICATIONS

English translation of International Report on Patentability in PCT/JP2015/082601, dated Jun. 15, 2017.

* cited by examiner

DEVICE FOR HEATING WASHER FLUID

TECHNICAL FIELD

The present invention relates to a washer fluid heating device.

BACKGROUND ART

Conventionally, a washer fluid heating device has been mounted on a vehicle, etc. to remove frost in winter. For example, Patent Literature 1 describes a washer fluid heating device having a structure in which a heating chamber is accommodated in a heat-retaining hot water storage chamber and an electric heater is accommodated inside the heating chamber. In the heating device described in Patent Literature 1, a washer fluid of the heat-retaining hot water storage chamber may be allowed to flow into the heating chamber by opening an outflow passage of the washer fluid at an upper part of the heating chamber. After the washer fluid is heated by the electric heater inside the heating chamber, the washer fluid is supplied to a washer nozzle by driving of a washer pump and sprayed from the washer nozzle.

CITATION LIST

Patent Literature

Patent Literature 1: Japanese Unexamined Patent Publication No. 2012-144194

SUMMARY OF INVENTION

Technical Problem

Incidentally, in a cold district, the washer fluid may freeze while the washer fluid heating device is turned OFF. In particular, in a case in which concentration of the washer fluid is low and close to water or a freezing temperature of the washer fluid is high, there is a concern that the washer fluid heating device may be damaged by the freezing and expanding washer fluid when the washer fluid is placed under a freezing point while the washer fluid heating device is turned OFF for a long period of time at night, etc.

An object of the invention is to provide a washer fluid heating device which can be used even in a cold environment.

Solution to Problem

A washer fluid heating device of an aspect of the invention includes a container that contains a washer fluid, a lid portion attached to a first end of the container to face an accommodation space for the washer fluid, heating means that has a proximal end portion attached to the lid portion and extends toward the accommodation space, and an outflow pipe having an outlet disposed in the accommodation space to allow the washer fluid in the accommodation space to flow out, and the outlet of the outflow pipe is provided such that a space formed between a horizontal plane passing through the outlet and an inner wall surface at a second end on an opposite side to the first end of the container corresponds to 10% or more of a volume of the accommodation space.

According to the washer fluid heating device of the aspect of the invention, the lid portion is attached to the first end of the container, and the outflow pipe having the outlet that allows the washer fluid in the accommodation space to flow out is disposed in the accommodation space of the container. The space formed between the horizontal plane passing through the outlet and the inner wall surface at the second end on the opposite side to the first end of the container corresponds to 10% or more of the volume of the accommodation space. In other words, an air layer corresponding to 10% or more of the volume of the accommodation space is formed in the accommodation space of the container. Therefore, even when the washer fluid in the accommodation space freezes and expands, the container is rarely damaged, and the washer fluid heating device is stably used even in a cold environment.

In addition, a heat insulating property of the lid portion may be lower than a heat insulating property of the container. At the time of use, the lid portion is located at a lower side of the washer fluid heating device. In this case, since the heat insulating property of the lid portion is lower than the heat insulating property of the container, heat is transferred from the lid portion side, and the washer fluid starts to freeze from below. Here, the air layer corresponding to 10% or more of the volume of the accommodation space is formed above the outlet. Therefore, an effect of preventing the washer fluid heating device from being damaged can be further enhanced in the cold environment.

In addition, the washer fluid heating device may further include an inflow pipe having an inlet disposed in the accommodation space to allow the washer fluid to flow into the accommodation space. In this case, the washer fluid directly flows into the accommodation space by the inflow pipe. Therefore, a structure of the washer fluid heating device becomes simpler and more compact.

In addition, the outflow pipe may be fixed by a fixing member attached to a distal end portion of the heating means. In this case, since the distal end portion of the outflow pipe is fixed, a location of the outlet is stable. Therefore, the air layer may be more stably maintained.

In addition, a current plate inclined with respect to the central axis line may be disposed between the inlet and the outlet such that the washer fluid from the inlet spirally flows from a side of the first end to a side of the second end inside the container. In this case, the washer fluid sprayed from the inlet becomes a spiral water stream by the current plate. Therefore, the washer fluid flowing in from the inlet moves toward the outlet while successively pushing up the heated washer fluid without directly heading for the outlet. In addition, a retention time until the washer fluid flowing in from the inlet arrives at the outlet increases, and a washer fluid heating effect is improved.

In addition, the outlet may be located between a distal end surface of the heating means and the second end of the container. In this case, the heating means is rarely exposed from a liquid level of the washer fluid. Therefore, the washer fluid heating effect is further improved. In addition, a distal end of the heating means may be prevented from protruding to the air layer to cause a no-water burning state.

In addition, the outlet may be disposed to overlap the central axis line of the container. In this case, even when the washer fluid heating device is obliquely attached to a vehicle or the vehicle is obliquely parked, the space formed between the horizontal plane passing through the outlet and the inner wall surface at the second end opposite to the first end of the container may be maintained at 10% or more of the volume of the accommodation space.

Effects of Invention

An aspect of the invention provides a washer fluid heating device which can be used even in a cold environment.

DESCRIPTION OF EMBODIMENTS

Figure 1:
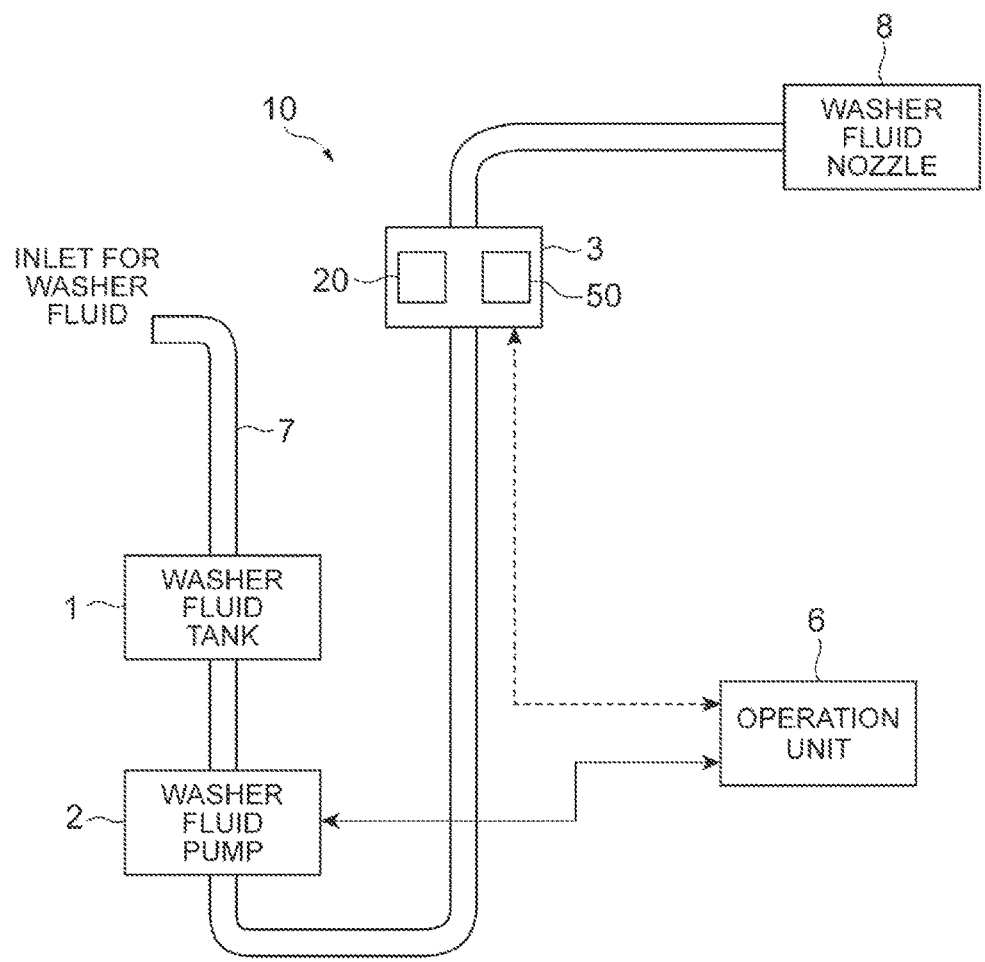
FIG. 1 is a diagram schematically illustrating a washer fluid supply system using an embodiment of the invention.

Hereinafter, an embodiment of the invention will be described with reference to drawings. In description of the drawings, the same reference numeral will be assigned to the same element, and a repeated description will be omitted.

Hereinafter, a description will be given of an example in which a washer fluid heating device 3 according to an embodiment of the invention is applied to a washer fluid supply system of a vehicle. As illustrated in FIG. 1, a washer fluid supply system 10 includes a washer fluid tank 1 that stores a washer fluid, a washer fluid pump 2 provided at an outlet side of the washer fluid tank 1, and a washer fluid nozzle 8 provided to face a front windshield of the vehicle. The supply system 10 further includes the washer fluid heating device 3 provided between the washer fluid pump 2 and the washer fluid nozzle 8. An operation unit 6 is connected to the washer fluid pump 2 and the washer fluid heating device 3. The washer fluid pump 2 may be operated when the operation unit 6 is operated by a driver of the vehicle, etc. The above respective devices are connected by a pipe line 7. The washer fluid tank 1 is connected to an injection hole for the washer fluid through the pipe line 7.

Figure 2:
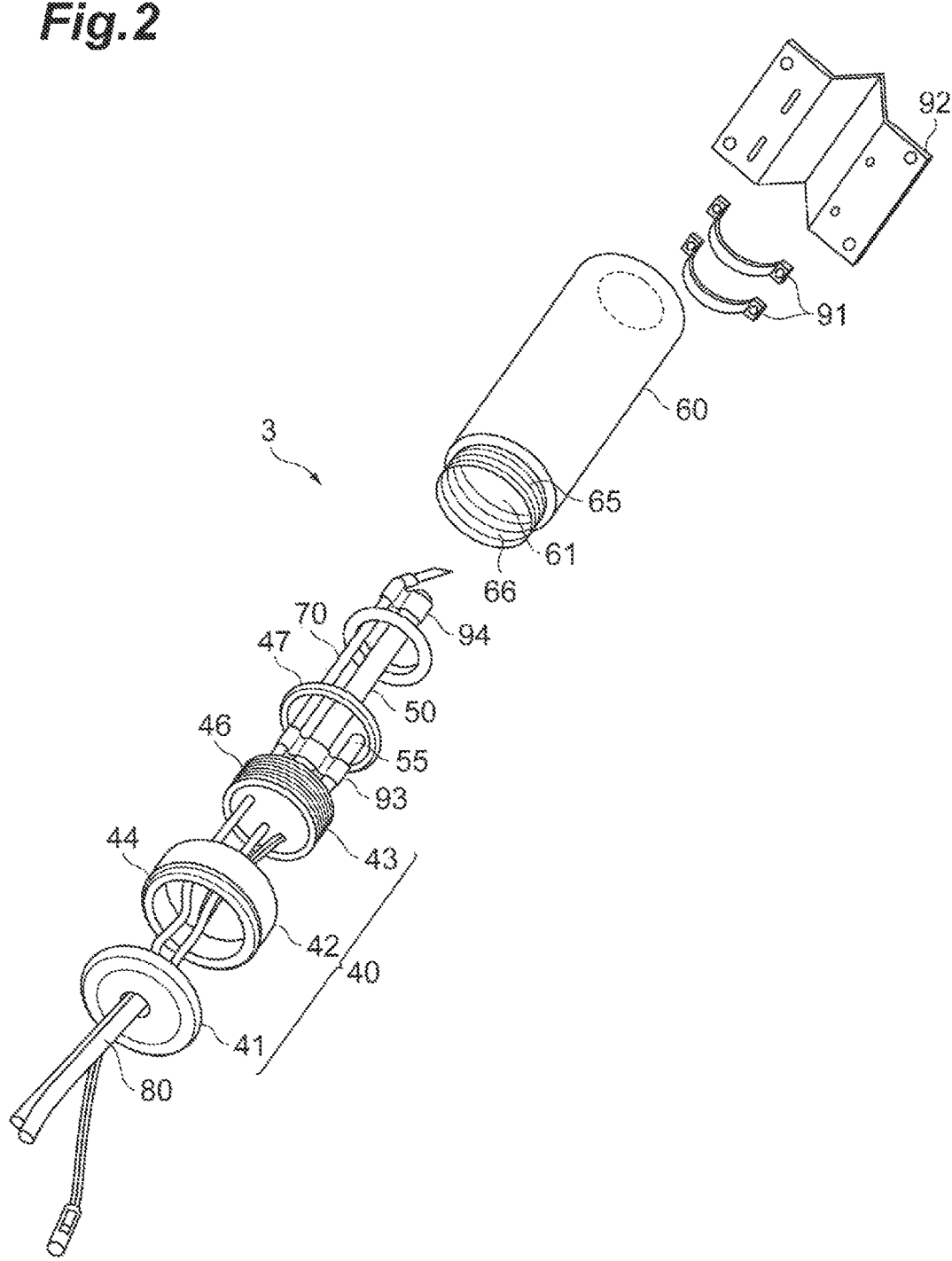
FIG. 2 is an exploded perspective view illustrating a washer fluid heating device of FIG. 1.
Figure 3:
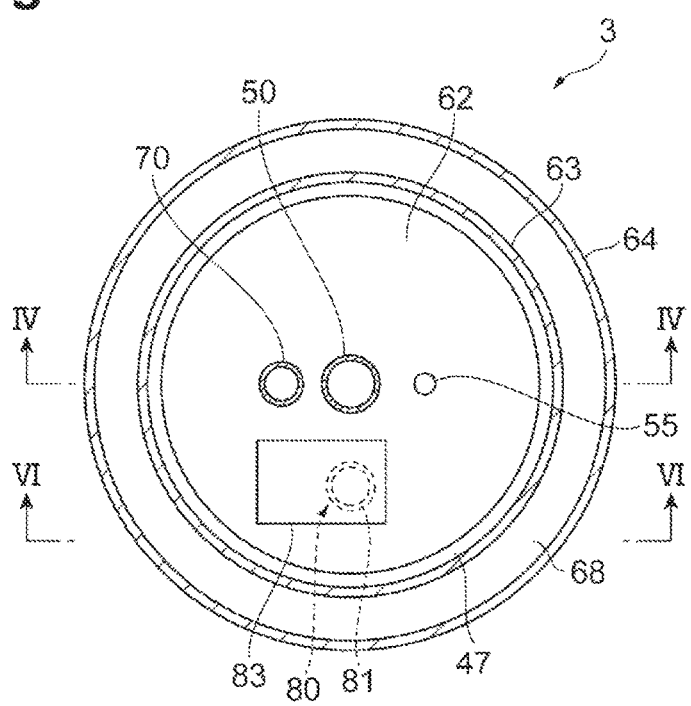
FIG. 3 is a planar cross-sectional view illustrating the washer fluid heating device of FIG. 1.
Figure 4:
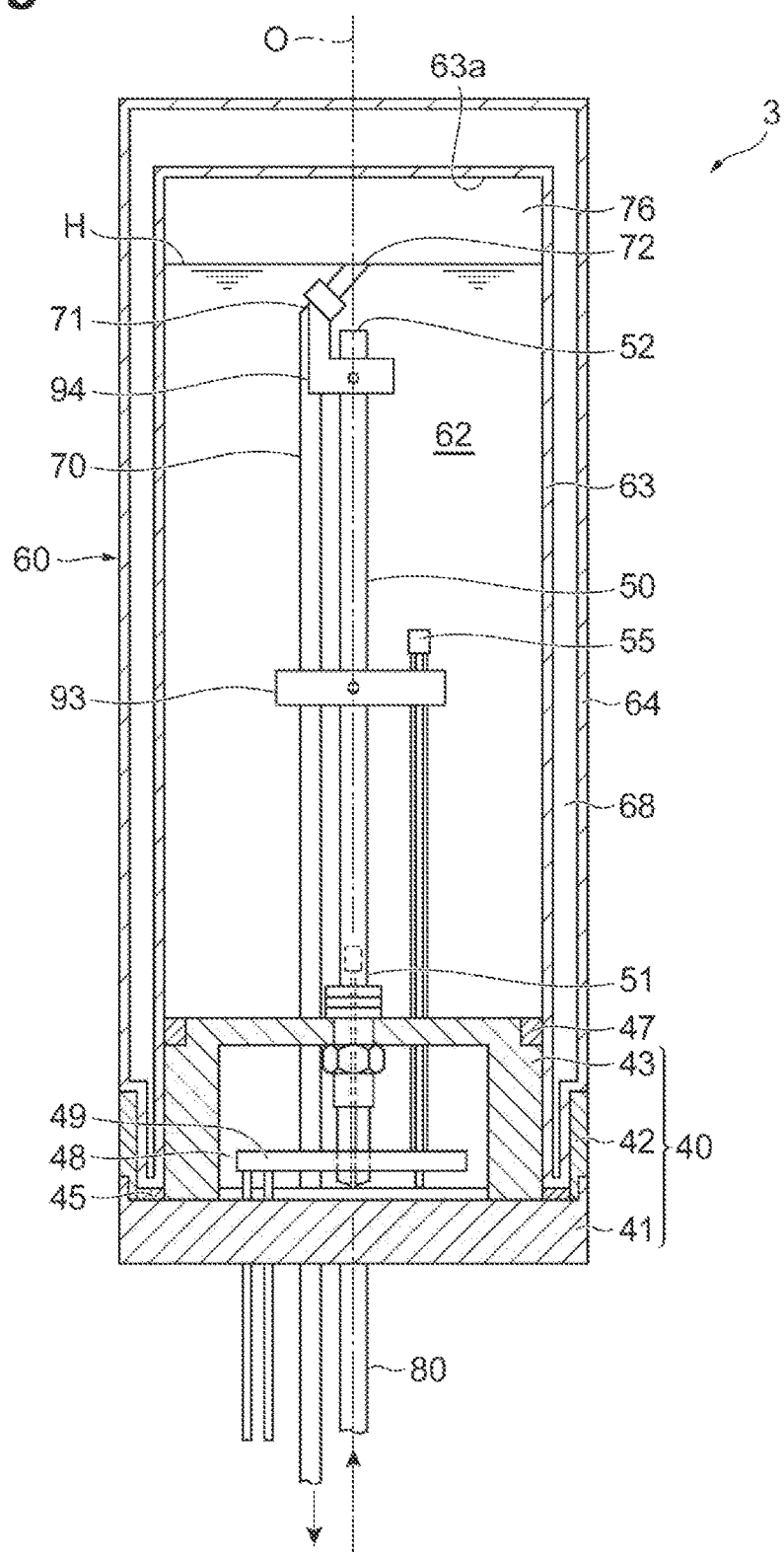
FIG. 4 is a cross-sectional view taken along IV-IV of FIG. 3.

As illustrated in FIG. 2 to FIG. 4, the washer fluid heating device 3 includes a cylindrical container 60, a lid portion 40 attached to a first end of the container 60 in a direction of a central axis line O to close an opening 61 of the container 60, and heating means 50 attached to the lid portion 40. The container 60 has a cylindrical accommodation space 62 that contains the washer fluid. A proximal end portion 51 of the heating means 50 is attached to the lid portion 40 and the heating means 50 extends toward the accommodation space 62 of the container 60. Here, the proximal end portion 51 of the heating means 50 corresponds to a portion of the heating means 50 on a first end side in the direction of the central axis line O.

The container 60 is fixed inside the vehicle by a plate-shaped support member 92 and a fixing band 91. The container 60 has a double structure similar to that of a thermos bottle and has a heat insulating structure for keeping the washer fluid in the accommodation space 62 warm. For example, an inner wall 63 of the container 60 is made of metal such as stainless steel, glass plated with metal, etc. An outer wall 64 of the container 60 is made of metal such as stainless steel. A vacuum layer 68 is formed between the inner wall 63 and the outer wall 64.

At the first end of the container 60 at which the opening 61 is formed, a screw portion 65 is formed on an outer peripheral surface thereof and a screw portion 66 is formed on an inner peripheral surface thereof. In the present embodiment, a term "lower" means the first end side with respect to the container 60, that is, the side of the lid portion 40.

The lid portion 40 faces the accommodation space 62 for the washer fluid and seals the accommodation space 62. The lid portion 40 includes an inner plug 43 facing the accommodation space 62, a cover 42 attached to the screw portion 65 provided on the outer peripheral surface of the opening 61, and an outer lid 41 attached to the cover 42 to cover a lower surface of the inner plug 43. The outer lid 41 is attached to the cover 42 by being screwed into a screw portion 44 formed on a lower side of an outer peripheral surface of the cover 42. Annular packing 45 (see FIGS. 4 and 5) is provided between the outer lid 41 and an end surface of the container 60 on the opening 61 side. For example, each member included in the lid portion 40 is made of a resin such as polyphenylene sulfide (PPS), polypropylene (PP), etc.

A screw portion 46 is formed on an outer peripheral surface of the inner plug 43. The inner plug 43 is attached to the container 60 by screwing the screw portion 46 and the screw portion 66 of the opening 61 of the container 60. A groove portion for mounting packing 47 is formed along an outer peripheral portion thereof on an upper surface of the inner plug 43. The opening 61 of the accommodation space 62 is sealed by the inner plug 43 and the packing 47. A depression 48 which is recessed to the accommodation space 62 side and open downward is formed in the inner plug 43. The depression 48 is filled with a resin such as urethane, and a control board 49 is buried therein.

The heating means 50 is mounted by a proximal end portion thereof penetrating the inner plug 43. The heating means 50 extends toward a second end side opposite to the lid portion 40. An axis of the heating means 50 is located on the central axis line O of the container 60. A distal end surface 52 is formed on a distal end side of the heating means 50 in an axial direction. Here, a distal end portion of the heating means 50 refers to a portion on a distal end side of a central portion of a portion extending in the accommodation space 62. The distal end surface 52 of the heating means 50 has a planar shape. However, the distal end surface 52 may have a curved surface shape other than the planar shape such as a mountain shape, a depression, a projection, etc.

A temperature sensor 55 is provided around a central portion of the accommodation space 62 in an extending direction. The temperature sensor 55 is connected to the control board 49 accommodated in the depression 48 of the inner plug 43 by a lead wire. The lead wire of the temperature sensor 55 is held by a first holder 93 attached to the heating means 50 around the central portion of the accommodation space 62 in the extending direction.

The temperature sensor 55 measures a temperature around the central portion of the accommodation space 62. The temperature sensor 55 may measure a temperature, and examples thereof include a thermistor, a thermocouple, etc. The temperature sensor 55 measures a temperature of the washer fluid in the accommodation space 62 and outputs the measured temperature to the control board 49. Heating adjusting means 20 (see FIG. 1) controls ON/OFF of the heating means 50 based on the temperature measured by the temperature sensor 55. In this way, the temperature of the washer fluid in the accommodation space 62 is maintained at a desired temperature (for example, about 40° C.).

The container 60 is provided with an outflow pipe 70 for allowing the washer fluid to flow out and an inflow pipe 80 for allowing the washer fluid to flow in. The outflow pipe 70 is connected to the washer fluid nozzle 8 by the pipe line 7. The inflow pipe 80 and the outflow pipe 70 penetrate the lid portion 40 to extend in the accommodation space 62. The inflow pipe 80 is connected to the washer fluid pump 2 by the pipe line 7.

The outflow pipe 70 has a bent portion 71 bent to an upper side of the heating means 50 and an outlet 72 formed at a distal end of the bent portion 71. The outflow pipe 70 for the washer fluid is fixed around the central portion of the accommodation space 62 in the extending direction by the first holder 93 attached to the heating means 50. The bent portion 71 of the outflow pipe 70 is fixed by a second holder 94 (fixing member) attached to the distal end portion of the heating means 50. One end of the second holder 94 extends to the upper side of the heating means 50 to form an annular member. The annular member is fixed by allowing the bent portion 71 to pass therethrough. The second holder 94 is made metal, resin, etc. having heat resistance.

Figure 5:
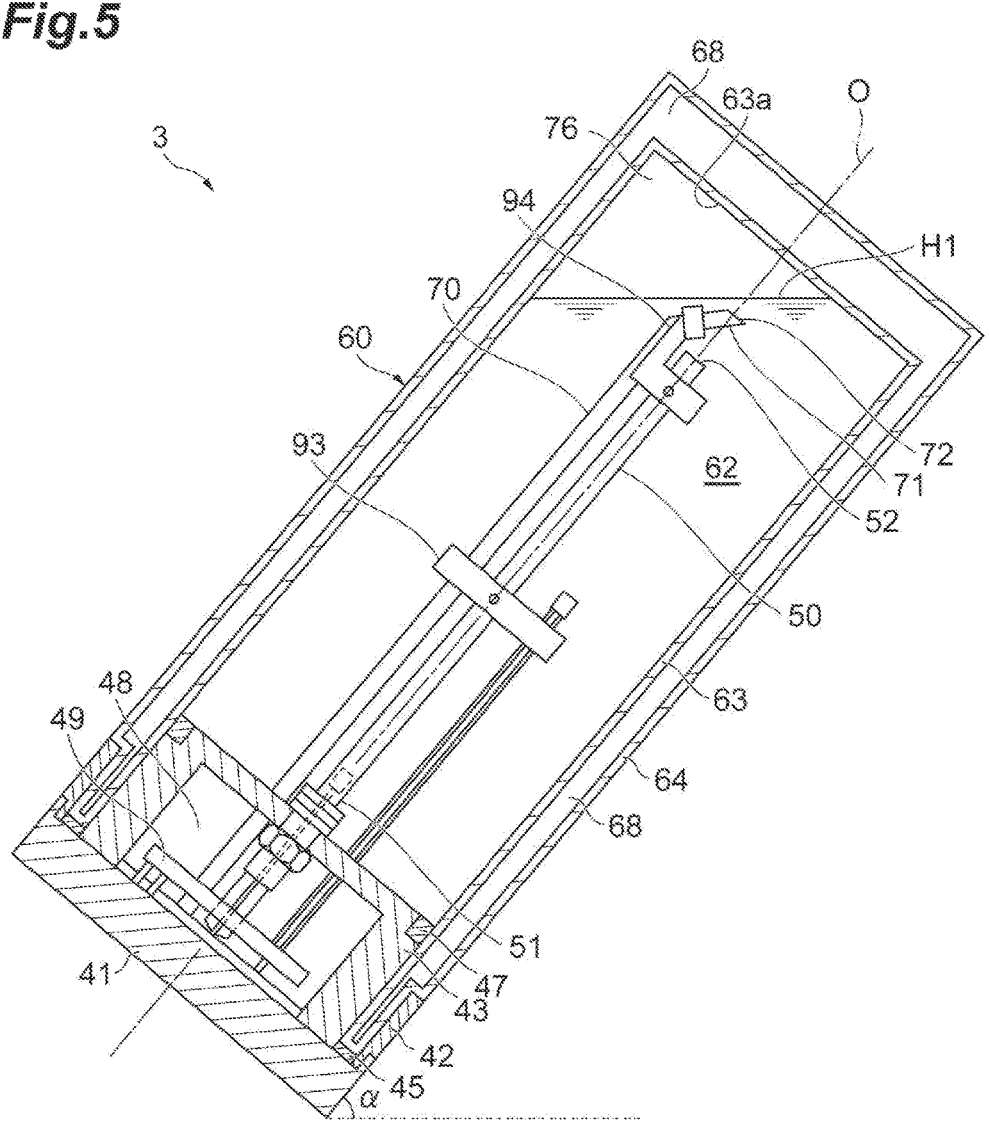
FIG. 5 is a side cross-sectional view illustrating a case in which the washer fluid heating device of FIG. 1 is inclined.

Next, a description will be given of the outlet 72 that allows the washer fluid to flow out, the distal end surface 52 of the heating means 50, and a liquid level H of the washer fluid with reference to FIG. 4 and FIG. 5. FIG. 4 is a cross-sectional view taken along IV-IV of FIG. 3. FIG. 5 is a side cross-sectional view illustrating a case in which the washer fluid heating device 3 of FIG. 1 is inclined.

The outlet 72 of the outflow pipe 70 is located at an upper side of the accommodation space 62. The outlet 72 forms an annular shape extending along a surface perpendicular to the central axis line O of the container 60. In addition, the outlet 72 is located at a position at which the washer fluid is 90% or less of a volume of the accommodation space 62 in a vertical direction of the container 60. That is, a flat cylindrical space 76 formed by a horizontal plane passing through the outlet 72 and an inner wall surface 63a of the accommodation space 62 on the second end side corresponds to 10% or more of the volume of the acconunodation space 62. This space 76 corresponds to an air layer above the washer fluid.

Here, a description will be given of a positional relation between the outlet 72 and the distal end surface 52 of the heating means 50. The outlet 72 is provided between the distal end surface 52 of the heating means 50 and the second end opposite to the lid portion 40 at the first end in the accommodation space 62. A region obtained by projecting the outlet 72 onto a virtual plane perpendicular to the central axis line O of the container 60 partially overlaps a region obtained by projecting the distal end surface 52 of the heating means 50 onto the virtual plane perpendicular to the central axis line O of the container 60. In addition, the outlet 72 is disposed to be located on the axis of the heating means 50. That is, the outlet 72 is disposed to be located directly above the distal end surface 52 of the heating means 50 in the direction of the central axis line O of the container 60.

As illustrated in FIG. 4, the liquid level H of the washer fluid stored in the accommodation space 62 of the container 60 substantially matches the horizontal plane passing through the outlet 72. The liquid level H of the washer fluid stored in the accommodation space 62 of the container 60 refers to a normal water level of the washer fluid when the washer fluid pump 2 is in an OFF state. When the washer fluid pump 2 is used, air corresponding to a compressive fluid may be compressed and the washer fluid may be maintained above the liquid level H of the washer fluid. In addition, when the vehicle is tilted while the washer fluid pump 2 is in the OFF state, the liquid level of the washer fluid stored in the accommodation space 62 of the container 60 is, for example, a liquid level H1 as illustrated in FIG. 5. In this case, a space 76 having a volume of 10% or more of the volume of the accommodation space 62 is formed between the liquid level H1 and the inner wall surface 63a of the accommodation space on the second end side. A shape of the space 76 corresponds to a shape obtained by obliquely cutting out a part of a ridge portion of a cylinder.

FIG. 5 illustrates a state in which the washer fluid heating device 3 is inclined by an angle α, for example, 40° with respect to a horizontal plane. As illustrated in FIG. 5, the liquid level H1 of the washer fluid is formed above the outlet 72. In this instance, the liquid level H1 of the washer fluid is maintained without change.

In more detail, even when the washer fluid heating device 3 illustrated in FIG. 4 is inclined, the space 76 formed above the horizontal plane passing through the outlet 72 corresponds to 10% or more of the volume of the accommodation space 62. Examples of a case in which the washer fluid heating device 3 is inclined include a case in which the vehicle is inclined with respect to the horizontal plane or a case in which the washer fluid heating device 3 is obliquely attached to the vehicle. For example, when the washer fluid heating device 3 is obliquely attached at 25° with respect to the horizontal plane of the vehicle and the vehicle is further inclined by 25° with respect to the horizontal plane in the same direction, the washer fluid heating device 3 is inclined by 50° in total with respect to the horizontal plane.

Here, freezing of the washer fluid heating device 3 will be described. In a process of using the washer fluid heating device 3, after the washer fluid flowing into the accommodation space 62 is heated by the heating means 50, the washer fluid flows into the outlet 72, and is sent to the outside of the container 60. In general, the outlet is installed at an upper side of the accommodation space as possible for the purpose of efficient use of the washer fluid heating device such as full utilization of a capacity of the washer fluid heating device or an increase in staying time of the washer fluid. In this case, the liquid level of the washer fluid is maintained at a high water level in the accommodation space, the accommodation space is substantially full of the washer fluid, and a utilization ratio of the washer fluid heating device is improved as a whole. Meanwhile, when the washer fluid heating device is used in a cold area, the washer fluid stored in the accommodation space is frozen and a volume thereof expands. In this case, stress is applied to the inner wall 63 of the container 60 when the washer fluid substantially fully filling the accommodation space freezes and expands to increase to a volume equal to or larger than the volume of the accommodation space.

When the increase in volume of the washer fluid due to freezing is maintained, there is a possibility that the washer fluid heating device 3 may be damaged. However, damage to the washer fluid heating device 3 may be prevented when the outlet 72 is located at a position at which the washer fluid corresponds to 90% or less of the volume of the accommodation space 62 in which the washer fluid is stored in the vertical direction of the accommodation space 62. In other words, an expansion force is prevented from being applied to the washer fluid heating device 3 at the time of freezing of the washer fluid when the space 76 formed by the horizontal surface passing through the outlet 72 and the inner wall surface 63a on the second end side of the container 60 corresponds to 10% or more of the volume of the accommodation space 62. Here, the space 76 may correspond to 10% or more and 20% or less of the volume of the accommodation space 62. In this case, it is possible to achieve both heating efficiency and a breakage preventing effect at the time of freezing with respect to the washer fluid heating device.

Figure 6:
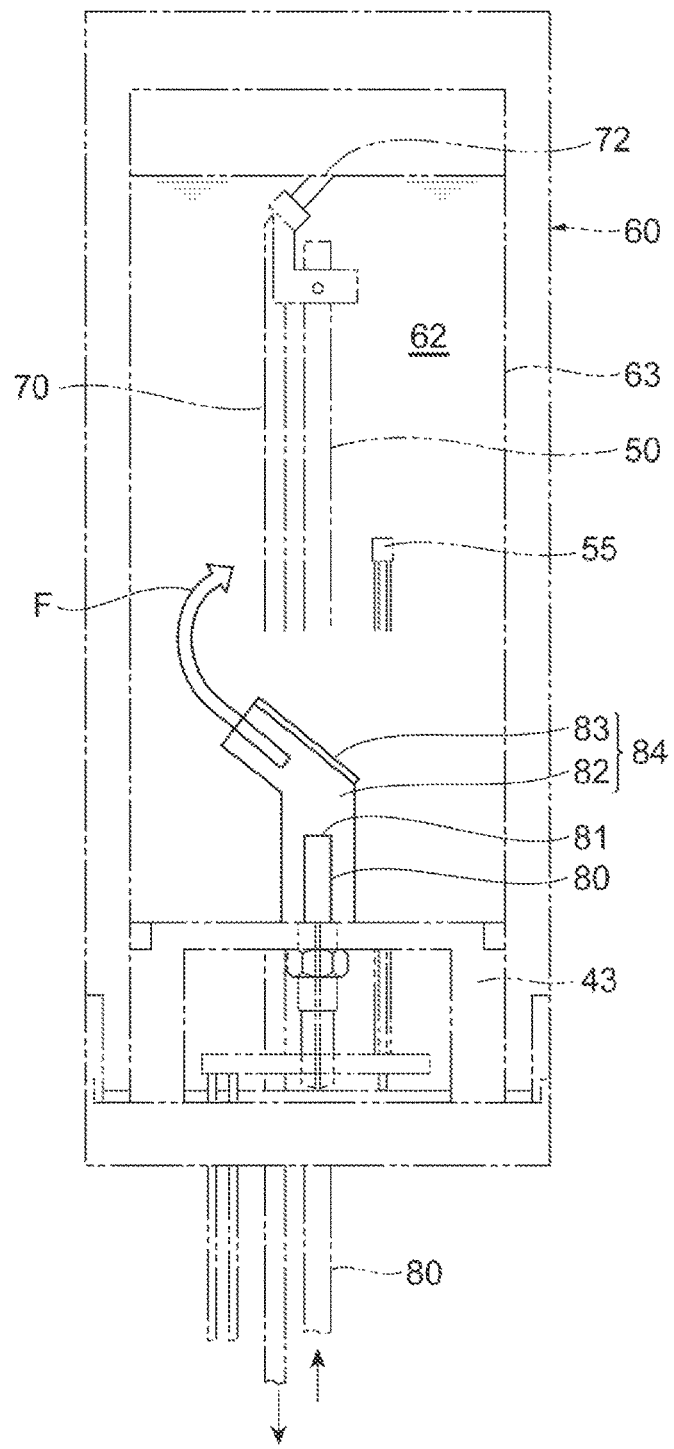
FIG. 6 is a cross-sectional view taken along VI-VI of FIG. 3 and is a schematic view illustrating an inlet and a current plate of the washer fluid heating device.

Hereinafter, the inflow pipe for washer fluid and a current plate will be described with reference to FIG. 3 and FIG. 6. FIG. 3 is a planar cross-sectional view illustrating the washer fluid heating device of FIG. 1. FIG. 6 is a cross-sectional view taken along VI-VI of FIG. 3 and is a schematic view illustrating the inlet and a current plate of the washer fluid heating device.

As illustrated in FIG. 3, the inflow pipe 80 (an inlet 81) for the washer fluid is disposed on one side of a virtual plane connecting center axes of the outflow pipe 70 for the washer fluid and the heating means 50. The inflow pipe 80 for the washing fluid penetrates the lid portion 40 and extends in the accommodation space 62. The inlet 81 is formed at a distal end of the inflow pipe 80 for the washing fluid. The inlet 81 is disposed in a substantially lower half portion in the vertical direction of the accommodation space 62. A current plate 83 of a rectification member 84 (see FIG. 6) is disposed above the inlet 81 to cover the inlet 81 when viewed from above.

The rectification member 84 has a standing plate 82 attached to the inner plug 43 and the current plate formed by bending the standing plate 82. The standing plate 82 is disposed between the heating means 50 and the inflow pipe 80 to be parallel to the virtual plane connecting the center axes of the outflow pipe 70 and the heating means 50. An upper end portion of the standing plate 82 is bent toward the inner wall 63 side to cover the inlet 81, thereby forming the current plate 83.

As illustrated in FIG. 6, the current plate 83 is located above the inlet 81 and below the outlet 72. That is, the current plate 83 is disposed between the inlet 81 and the outlet 72. An inclined direction of the current plate 83 is parallel to a virtual plane formed by the axis of the outflow pipe 70 for the washer fluid and the central axis line O of the container 60, and is inclined toward an opposite side to the outflow pipe 70 with respect to the central axis line O. Here, the inclined direction of the current plate 83 is a normal direction of a plane forming the current plate 83.

Here, a description will be given of a process after the washer fluid flows into the accommodation space 62 of the container 60 in the washer fluid heating device 3. The washer fluid sent by the washer fluid pump 2 is sprayed into the accommodation space 62 from the inlet 81 through the inflow pipe 80. The washer fluid after spraying collides with the current plate 83 of the rectification member 84 by momentum. The current plate 83 changes a flow direction of the washer fluid to rise obliquely along a tilt direction of the current plate 83. The washer fluid guided to a side of the container 60 to flow up to the inner wall 63 continues to flow along the inner wall 63 while rising in an oblique direction. As a result, the washer fluid flows to rise along a helical direction F from the first end side to the second end side in the accommodation space 62 inside the container 60. The washer fluid flowing in from the inlet 81 moves toward the outlet 72 while successively pushing up the heated washer fluid without directly heading for the outlet 72 by rising along the helical direction F. In addition, the washer fluid flowing in from the inlet 81 stays in the accommodation space 62 for a long time and is sufficiently heated.

Next, a description will be given of a method of operating the washer fluid supply system 10 using the washer fluid heating device 3 of the present embodiment.

For example, the washer fluid heating device 3 operates when the driver, etc. turns ON an ignition key. In this way, the washer fluid in the accommodation space 62 is heated to a desired temperature by the heating means 50. Subsequently, when an operation command is delivered to the washer fluid pump 2 by the driver, etc. operating the operation unit 6, the washer fluid stored in the washer fluid tank 1 is supplied to the washer fluid heating device 3 by the washer fluid pump 2 and flows into the accommodation space 62 of the heating device 30 through the inflow pipe 80 for the washer fluid. In the accommodation space 62, the washer fluid flowing in from the inlet 81 is heated while spirally rising. At the same time, the washer fluid successively raises the heated washer fluid present in an upper part of the accommodation space 62. As a result, the heated washer fluid flows into the outlet 72 of the outflow pipe 70 for the washer fluid disposed in an upper region of the accommodation space 62. The washer fluid in the outflow pipe 70 is delivered to the washer fluid nozzle 8 via the pipe line 7 by driving the washer fluid pump 2. Through this series of operations, a warmed washer fluid is supplied to the front windshield of vehicle.

Here, when the washer fluid heating device 30 is in an OFF state, the washer fluid is stored in the accommodation space 62 for accommodating the washer fluid. When the washer fluid heating device 3 is placed below freezing, the washer fluid in the accommodation space 62 is frozen. The space 76 corresponding to 10% or more of the volume of the accommodation space 62 is formed above the washer fluid in the accommodation space 62. Therefore, even when all the washer fluid is frozen, the washer fluid heating device 3, etc. is not damaged.

According to the above-described washer fluid heating device 3 of the present embodiment, the lid portion 40 is attached to the first end of the container 60, and the outflow pipe 70 having the outlet 72 that allows the washer fluid in the accommodation space 62 to flow out is disposed in the accommodation space 62 of the container 60. The space 76 formed between the inner wall 63 at the second end on the opposite side to the first end of the container 60 and the horizontal plane passing through the outlet 72 corresponds to 10% or more of the volume of the accommodation space 62. That is, an air layer corresponding to 10% or more of the volume of the accommodation space 62 is formed in the accommodation space 62 of the container 60. Therefore, even when all the washer fluid of the accommodation space 62 freezes and expands, the container 60 is rarely damaged, and the washer fluid heating device may be stably used even in a cold environment.

In addition, the container 60 has a heat insulating structure having a high heat insulating property. The lid portion 40 made of resin, etc. is attached to the first end of the container 60. The outflow pipe 70 and the inflow pipe 80 are attached to the lid portion 40. That is, a heat insulating property of the lid portion 40 is lower than the heat insulating property of the container 60. For this reason, heat is transferred from the lid portion 40 side to the accommodation space 62, and the washer fluid starts to freeze from below. The washer fluid pushed up by this freezing is discharged to the outside of the container 60 via the outlet 72 located in the accommodation space 62. In addition, at the second end of the container 60, the air layer corresponding to 10% or more of the volume of the accommodation space 62 is formed above the outlet 72.

Therefore, an effect of preventing the washer fluid heating device 3 from being damaged can be further enhanced in the cold environment.

In addition, since the washer fluid heating device 3 includes the inflow pipe 80 having the inlet 81 disposed in the accommodation space 62 to allow the washer fluid to flow into the accommodation space 62, the washer fluid directly flows into the accommodation space 62 by the inflow pipe 80, and a structure of the washer fluid heating device 3 becomes simpler and more compact.

In addition, since the outflow pipe 70 is fixed to the second holder 94 (fixing member) attached to the distal end portion of the heating means 50, a distal end portion of the outflow pipe 70 is fixed, a position of the outlet 72 is stable, and a more stable air layer is maintained.

In addition, since the outlet 72 is located between the distal end surface 52 of the heating means 50 and the second end of the container 60, the heating means 50 is rarely exposed from the liquid level of the washer fluid, and a washer fluid heating effect is further improved. In addition, the distal end portion of the heating means 50 is prevented from protruding to the air layer to cause a no-water burning state. Further, since a relative position between the distal end portion of the heating means 50 and the outlet 72 is kept constant by the second holder 94 (fixing member), it is possible to more reliably prevent the distal end portion of the heating means 50 from protruding to the air layer to cause the no-water burning state.

Further, the outlet 72 is disposed to overlap the central axis line of the container 60. Thus, even when the washer fluid heating device 3 is obliquely attached to the vehicle or the vehicle is obliquely parked, the space 76 formed between the horizontal plane passing through the outlet 72 and the inner wall surface 63a at the second end opposite to the first end of the container 60 is maintained at 10% or more of the volume of the accommodation space 62.

Hereinbefore, the present embodiment has been described. However, the invention is not limited to the above-described embodiment, and various modified embodiments can be adopted. For example, instead of forming the outlet 72 perpendicular to the central axis line O of the container 60, a notch, etc. may be formed in a part of a distal end of the outflow pipe 70, or the outlet 72 may be inclined with respect to the central axis line O. In this case, similarly to a case in which the outlet 72 is perpendicular to the central axis line O, damage to the washer fluid heating device 3 below freezing point is prevented by forming the air layer corresponding to 10% or more of the volume of the accommodation space 62 at the upper side of the accommodation space 62.

Further, a heat insulating cover made of a heat insulating material such as urethane may be provided outside the container 60. In this case, since the heat insulating property of the container 60 is further improved, an effect of starting freezing of the washer fluid from a lower side is improved. Further, in the above embodiment, the container 60 and the accommodation space 62 are cylindrical. However, the invention is not limited thereto. For example, each of the container 60 and the accommodation space 62 may have a polygonal columnar shape or an elliptical columnar shape.

In the above embodiment, the outlet 72 is located immediately above the distal end surface 52 of the heating means 50 by bending the distal end portion of the outflow pipe 70. However, the outlet 72 may be located immediately above the heating means 50 by obliquely disposing the outflow pipe 70 with respect to the heating means 50. In addition, the outlet 72 may not be located immediately above the distal end surface 52 of the heating means 50.

In the above embodiment, the heating means 50 is disposed such that the axis of the heating means 50 is located on the central axis line of the container 60. However, the invention is not limited thereto. For example, the heating means 50 may be obliquely attached with respect to the central axis line of the container 60.

INDUSTRIAL APPLICABILITY

An aspect of the invention allows use in a cold environment.

REFERENCE SIGNS LIST

3 . . . washer fluid heating device, 40 . . . lid portion, 50 . . . heating means, 51 . . . proximal end portion, 60 . . . container, 62 . . . accommodation space, 63 . . . inner wall, 70 . . . outflow pipe, 72 . . . outlet, 80 . . . inflow pipe, 81 . . . inlet, 83 . . . current plate, 94 . . . second holder, O . . . central axis line of container.

The invention claimed is:

1. A washer fluid heating device comprising:
a container configured to contain a washer fluid;
a lid portion attached to a first end of the container to face an accommodation space for the washer fluid, the accommodation space located between the lid portion and a second end of the container opposite the first end in a direction of a central axis line of the container;
a heater that comprises a proximal end portion attached to the lid portion and a distal end portion that extends into the accommodation space; and
an outflow pipe comprising an outlet located in the accommodation space to allow the washer fluid in the accommodation space to flow out,
wherein the outlet of the outflow pipe is disposed at a position at which a space formed between a horizontal plane passing through the outlet and an inner wall surface at the second end corresponds to 10% or more of a volume of the accommodation space;
wherein the outflow pipe is fixed by a fixing member attached to the distal end portion of the heater at the second end of the container.

2. The washer fluid heating device according to claim 1, wherein an end of the fixing member comprises an annular member.

3. The washer fluid heating device according to claim 2, wherein the annular member supports the outflow pipe to pass therethrough so as to fix the outflow pipe.

4. The washer fluid heating device according to claim 2, wherein the annular member supports a bent portion of the outflow pipe to pass therethrough so as to fix the outflow pipe.

5. The washer fluid heating device according to claim 2, wherein the fixing member is made of at least one of a metal and a heat resistant resin.

6. The washer fluid heating device according to claim 1, wherein the container has a heat insulating structure for keeping the washer fluid in the accommodation space warm, and
a heat insulating property of the lid portion is lower than a heat insulating property of the container.

7. The washer fluid heating device according to claim 6, wherein the heat insulating structure comprises an inner wall, an outer wall and a vacuum layer formed between the inner wall and the outer wall.

8. The washer fluid heating device according to claim 7, wherein the inner wall is made of at least one of a metal and a glass,
the outer wall is made of the metal, and
the lid portion is made of a resin.

9. The washer fluid heating device according to claim 6, wherein a heat insulating cover made of a heat insulating material is provided outside the container.

10. The washer fluid heating device according to claim 9, wherein the heat insulating material is made of an urethane.

11. The washer fluid heating device according to claim 1, wherein the outlet of the outflow pipe is located at a position at which a space formed between a horizontal plane passing through the outlet and an inner wall surface at the second end corresponds to 10% or more of a volume of the accommodation space.

12. The washer fluid heating device according to claim 1, wherein the outlet is located between the distal end portion of the heater and the second end of the container.

13. The washer fluid heating device according to claim 1, wherein the outlet overlaps the central axis line of the container.

14. A washer fluid heating device comprising:
a container configured to contain a washer fluid;
a lid portion attached to a first end of the container to face an accommodation space for the washer fluid, the accommodation space located between the lid portion and a second end of the container opposite the first end in a direction of a central axis line of the container;
a heater that comprises a proximal end portion attached to the lid portion and a distal end portion that extends into the accommodation space;
an inflow pipe comprising an inlet located in the accommodation space to allow the washer fluid to flow into the accommodation space;
an outflow pipe comprising an outlet located in the accommodation space to allow the washer fluid in the accommodation space to flow out;
wherein the outlet of the outflow pipe is disposed at a position at which a space formed between a horizontal plane passing through the outlet and an inner wall surface at the second end corresponds to 10% or more of a volume of the accommodation space; and
a rectification member comprising:
a standing plate located between the heater and the inflow pipe in line with the central axis line; and
a current plate formed by bending the standing plate so as to incline with respect to the central axis line.

15. The washer fluid heating device according to claim 14, wherein the current plate is located between the inlet and the outlet such that the washer fluid from the inlet spirally flows from the first end to the second end of the container.

16. The washer fluid heating device according to claim 14, wherein the standing plate is parallel to a virtual plane connecting a center axis of the outflow pipe and a center axis of the heater.

17. The washer fluid heating device according to claim 14, wherein an upper end portion of the standing plate is bent toward an inner wall of the container to cover the inlet so as to form the current plate.

18. The washer fluid heating device according to claim 14, wherein a virtual plane that passes through both a center axis of the outflow pipe and the central axis line of the container is normal to a plane of the current plate.

19. The washer fluid heating device according to claim 14, wherein the container has a heat insulating structure for keeping the washer fluid in the accommodation space warm, and
a heat insulating property of the lid portion is lower than a heat insulating property of the container.

20. The washer fluid heating device according to claim 19, wherein the heat insulating structure comprises an inner wall, an outer wall and a vacuum layer formed between the inner wall and the outer wall.

* * * * *